United States Patent

[11] 3,525,303

| [72] | Inventor | Howard B. Cummings<br>New Castle, Pennsylvania |
|---|---|---|
| [21] | Appl. No. | 765,714 |
| [22] | Filed | June 11, 1968<br>Division of Ser. No. 342,560,<br>filed Feb. 4, 1964, now Pat. No.<br>3,388,658. |
| [45] | Patented | Aug. 25, 1970 |
| [73] | Assignee | By mesne assignments, to<br>Interspace Corporation<br>Parsippany, New Jersey<br>a corporation of Delaware. |

[54] APPARATUS FOR DECORATING POTTERY
5 Claims, 16 Drawing Figs.

[52] U.S. Cl................................................. 101/35,
101/115, 101/123, 101/126, 198/210
[51] Int. Cl................................................. B41f 17/28
[50] Field of Search..................................... 101/35,
115, 123, 126

[56] References Cited
UNITED STATES PATENTS

| 1,922,710 | 8/1933 | Owens.......................... | 101/123 |
|---|---|---|---|
| 2,124,011 | 7/1938 | Smith........................... | 101/123 |
| 2,383,947 | 9/1945 | Wensel et al. ................ | 101/123 |
| 2,569,049 | 9/1951 | Gordon......................... | 101/123 |
| 2,605,700 | 8/1952 | Martin.......................... | 101/123 |
| 2,692,552 | 10/1954 | Conkle......................... | 101/115 |
| 2,997,948 | 8/1961 | Scheeler et al. .............. | 101/126 |
| 3,054,345 | 9/1962 | Martin.......................... | 101/123 |

*Primary Examiner*—Robert E. Pulfrey
*Assistant Examiner*—Clifford D. Crowder
*Attorney*—Liddy, Sullivan, Hart, Daniels and Baxley

ABSTRACT: Apparatus for decorating china ware. Pieces of ware are carried successively by chucks on a turntable for positioning of their decorating surfaces into a path of operation of a silk screen decoration applicator. The applicator is movable to and from the path of operation. A squeegee is moved over the silk screen to transfer color therethrough to the decorating surface of the ware.

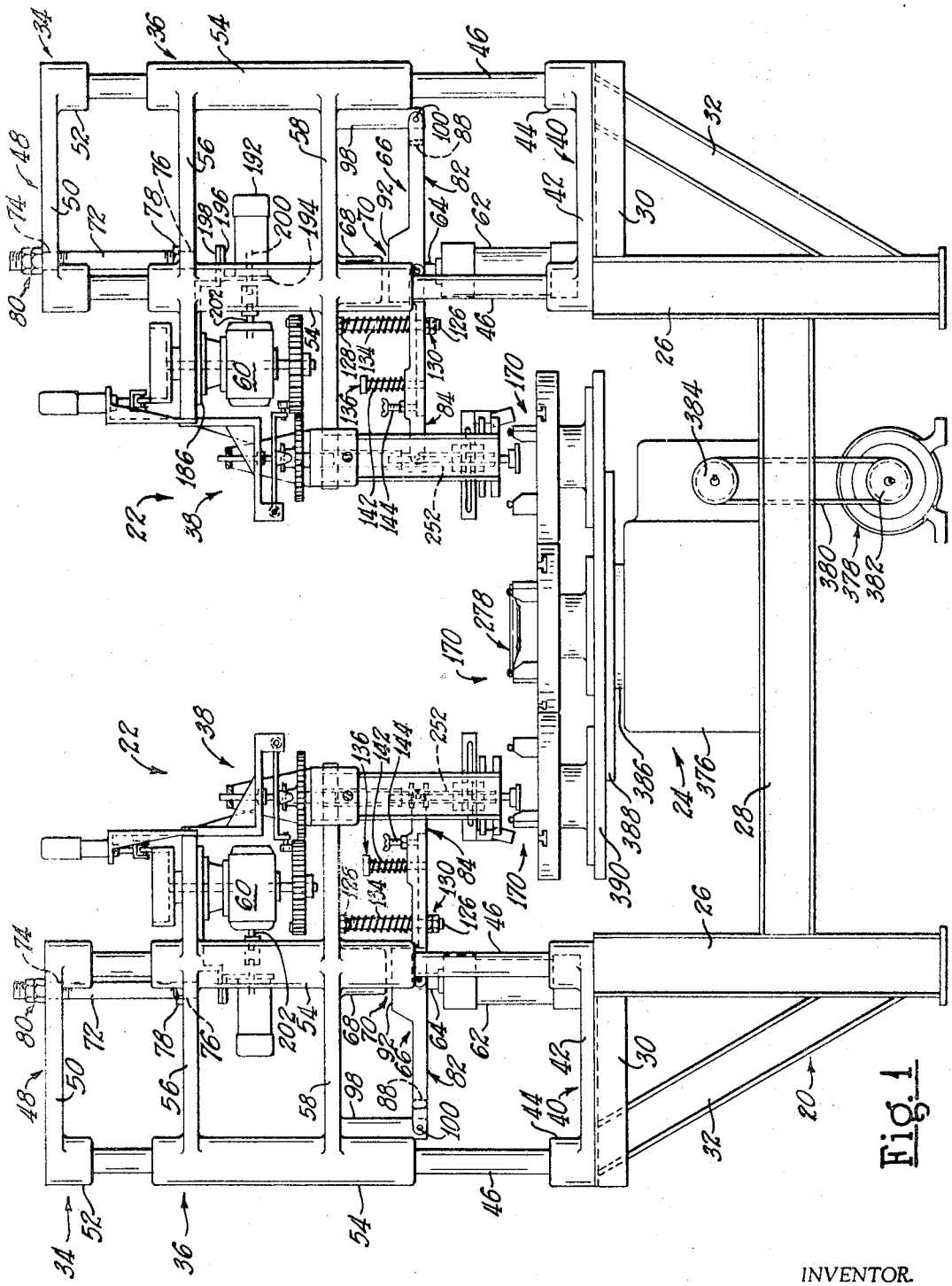

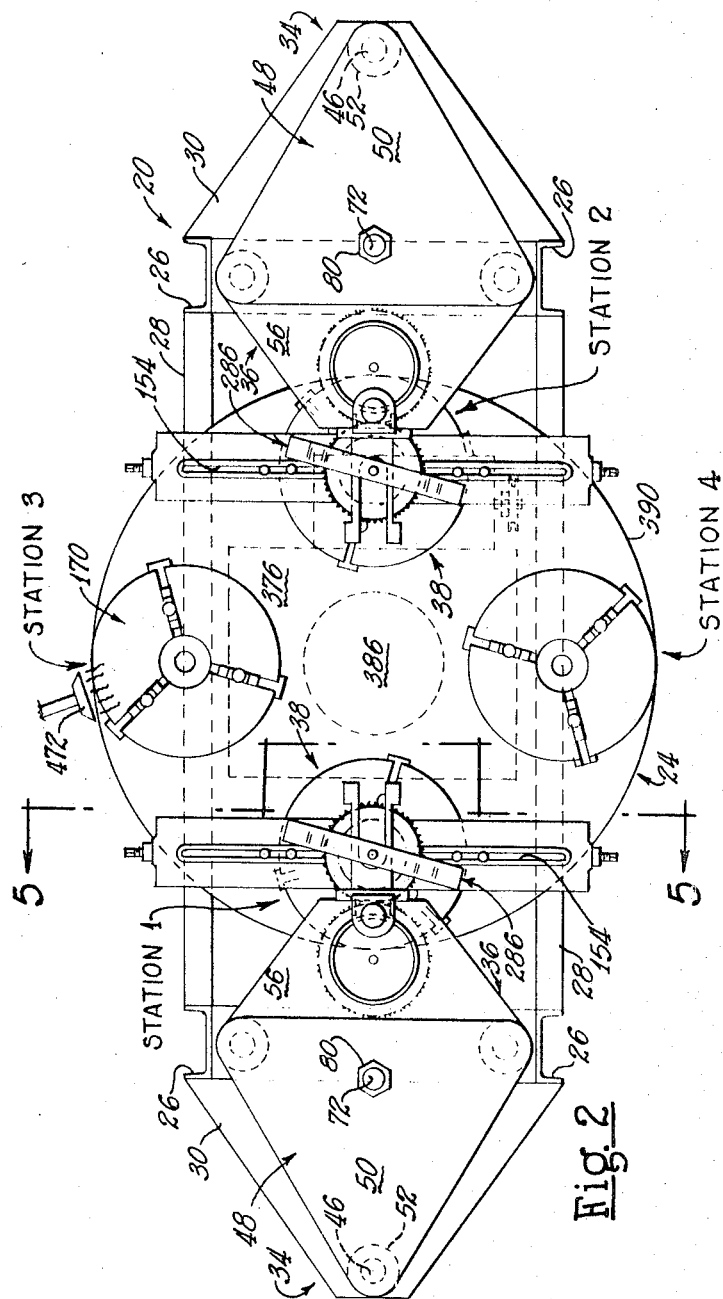

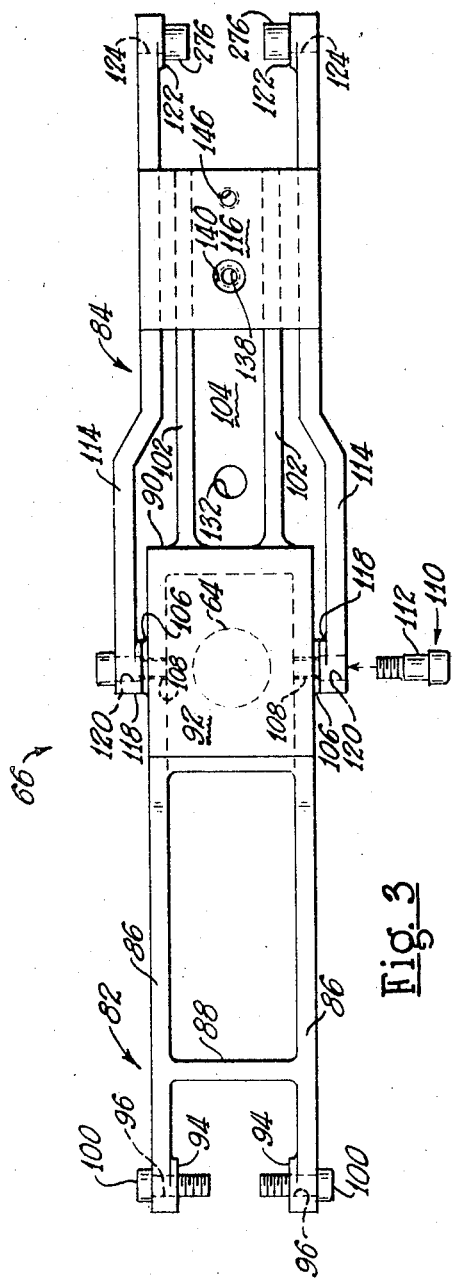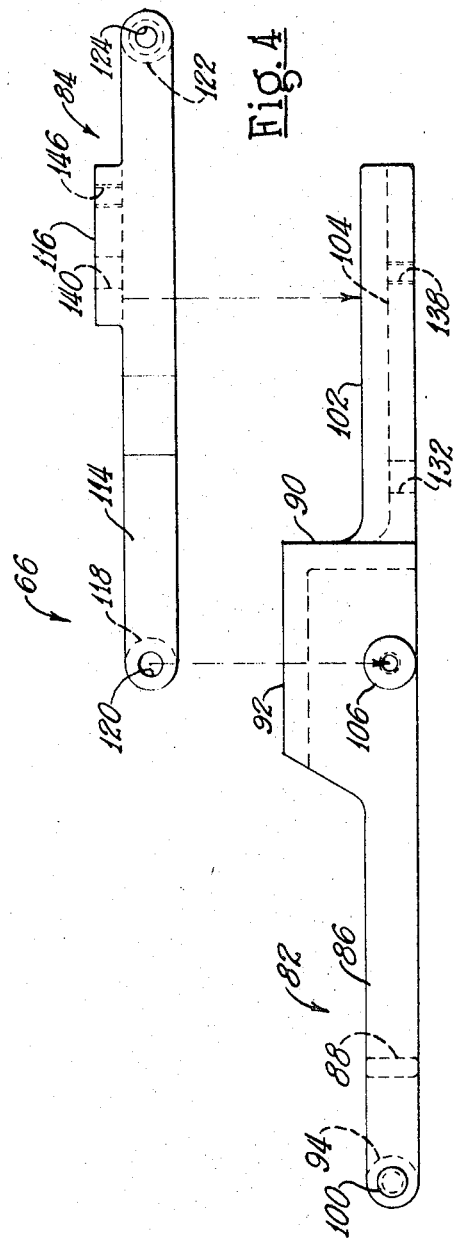
INVENTOR.
HOWARD B. CUMMINGS
ATTORNEYS

INVENTOR.
HOWARD B. CUMMINGS

Ely & Golrick
ATTORNEYS

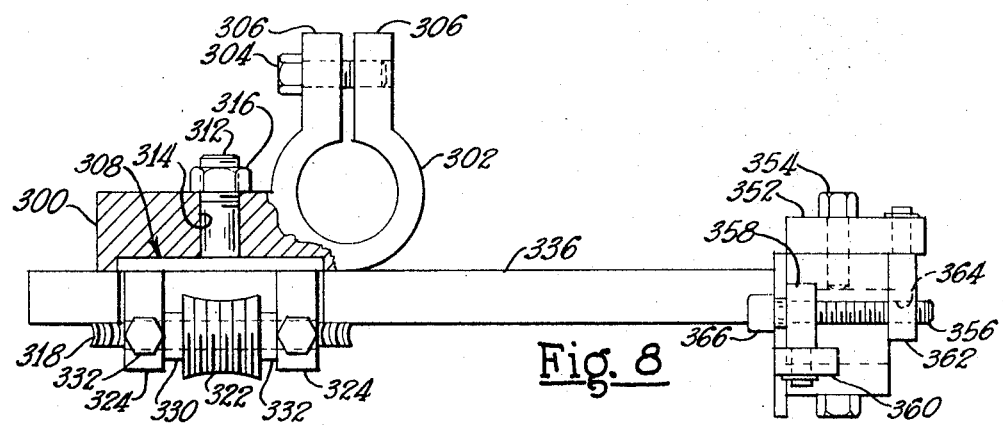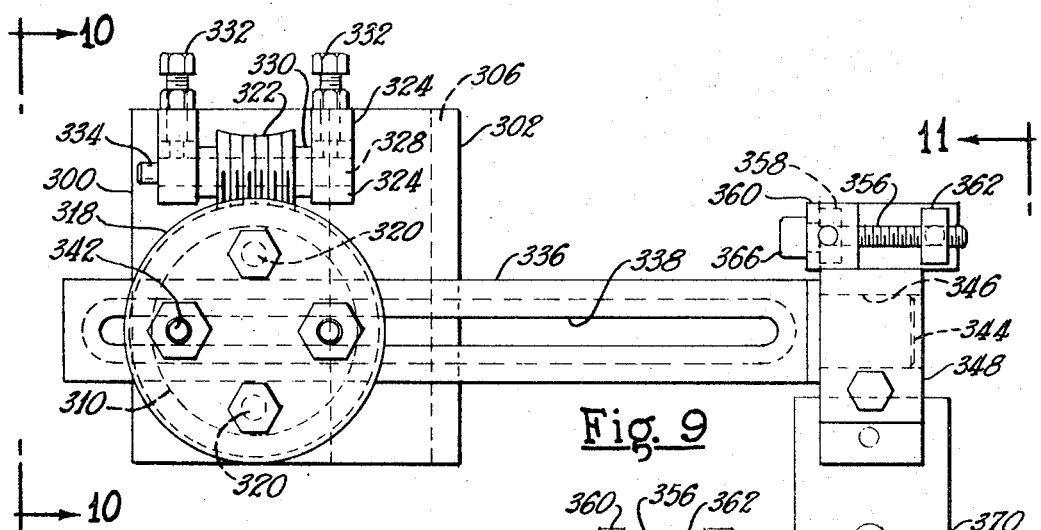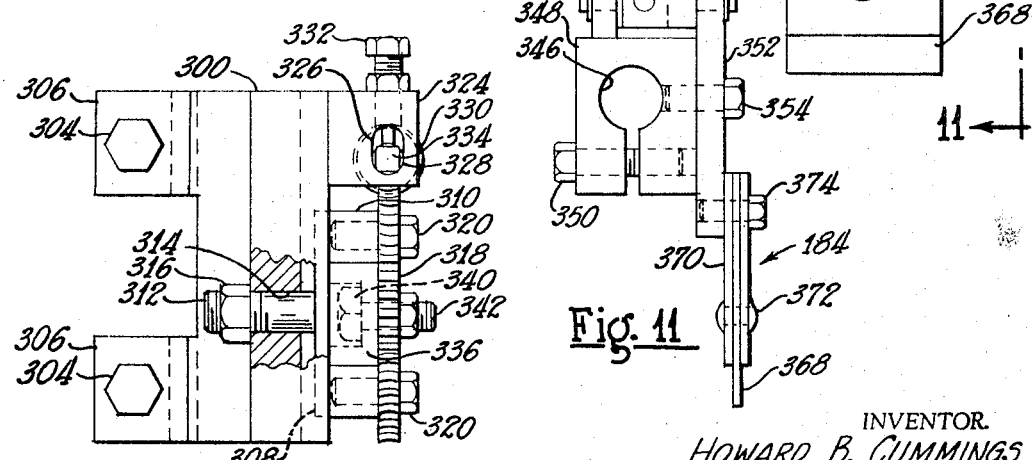

INVENTOR.
HOWARD B. CUMMINGS

Ely & Golrick
ATTORNEYS

APPARATUS FOR DECORATING POTTERY

This is a divisional application with respect to my copending application, Ser. No. 342,560, filed Feb. 4, 1964 (now U.S. Pat. No. 3,338,658).

This invention relates to the decoration of vitreous ware and, more particularly, to a machine for decorating vitreous ware in a plurality of colors with unique and unexpected accuracy of register and speed, eliminating goods in process.

THE PROBLEMS OF THE PRIOR ART

In the manufacture of vitreous china ware, a number of steps are involved that have heretofore presented very serious problems preventing the mechanization of the process for applying the decoration.

Manufacturing steps in producing ware include:

1. Forming clay by one of the following generally employed methods:
   a. slip casting;
   b. jiggering; or
   c. turning.

Any one of the above methods, at production speeds and conditions, produces ware which varies in dimension from piece to piece sufficiently to cause problems in later decoration.

2. Drying. Ware produced by any of the above techniques will contain moisture in excess of the bone-dryness which must be obtained before firing. Such drying will shrink the ware and may distort it unevenly from piece to piece.

3. Firing. During this step, ware will tend to shrink further and, additionally, will tend to warp or twist. This step is probably the major source of variations from piece to piece that have heretofore presented obstacles to decorating ware by automatic mechanical means, especially in multi-color decoration where accurate register and indexing of the several colors could not be obtained because of dimensional variations in individual pieces of ware.

4. For underglaze decoration, apply ceramic color by one of the following:
   a. Hand application. This may involve free-hand application of color from a brush or lining by a hand-held brush while the ware is turned on a turntable. Such hand operations most often involve application of decorations by decalcomania or transfer of a print on paper. Although such decorations are mechanically reproduced on paper, extensive and time-consuming detailed hand operations are involved in preparing the sheet material for transfer and, particularly, in fitting the cut-outs to the usually non-planar surfaces of the ware.
   b. Spray through a mask. Here again, the operation has been performed by hand because no machine existed for doing it with sufficient accuracy of register. Again, the nervousness of the hand did not produce accuracy of register between colors, in multi-color patterns. Also, drying created the expense of goods in process.
   c. Silk screen printing by hand. Silk screen decorations have been attempted mechanically, but without success. Any silk screen machines actually used heretofore have been hand-operated and limited to one color. This has also meant a time delay in intermediate drying between colors, and has caused extended periods of delay for goods in process. As is known, this is a high cost item in any manufacturing operation and its elimination is advantageous. Further, by use of the prior silk screen process, two or more colors have been extremely difficult to register.

After the first color is applied, the ware is completed by the following steps:

5. Glaze.
6. Glost fire.
7. Application of overglaze decoration as by one of the methods discussed above.
8. Firing the overglaze decoration.

COLOR APPLICATION HAS PRESENTED PROBLEMS

In summation, hand application of decoration by one of the methods discussed above has been used in the past for production operations simply because no machine existed for doing it better and faster. No machine was known that could apply the decoration to the distorted ware with sufficient accuracy of register to produce commercially acceptable products for relatively complex, multi-color patterns.

Also, by the prior art, only 1 color could be applied at a time else they would run together and ruin the decoration. This meant that after a first color was applied, the ware had to be set aside and dried before a subsequent color could be applied, to avoid intermingling and smearing.

The result is that, due to high labor costs and resultant high costs of ware, a large segment of the American pottery industry is being irreparably damaged by foreign competition.

It will be evident, therefore, that a machine capable of accurately and automatically decorating vitreous ware and capable of applying a plurality of colors in proper register so as to reduce the cost of manufacture of the ware to thus place American industry in a substantially more favorable competitive position would provide a substantial advancement to the art.

It is therefore an important object of this invention to provide a novel machine for decorating vitreous china ware.

A further object is to provide a novel method for decorating vitreous ware.

A still further object is to provide a novel mechanism for decorating vitreous china ware that is capable of applying multiple colors with a degree of accuracy of register not heretofore attainable; and surpassing the accuracy of register of multiple colors provided by hand decoration.

A further object is to provide method and apparatus for direct silk screen printing of decorations on vitreous ware.

A further object is to provide a machine and method for decorating vitreous ware with complex or simple line and band decorations; when used for multiple colors, it produces accurate register of the colors—and without delay of manufacture—by eliminating the goods in process factor for drying, and by further eliminating hand labor in the decorating operation.

A still further object is to provide a turntable type of ware decorating apparatus wherein an operator at one position can both load and unload the machine while the operations of decorating in multiple colors are effected automatically as the ware traverses the conveyor means of the machine.

A further object is to provide novel chuck mechanism for indexing and holding vitreous ware.

A further object is to provide novel chuck mechanism for holding vitreous ware that centers on the ware relative to the upper surface, i.e., the surface of the ware to be decorated.

Other objects of this invention will appear in the following description and appended claims, reference being had to the accompanying drawings forming a part of the specification wherein like reference characters designate corresponding parts in the several views.

In the drawings:

FIG. 1 is a side elevational view of the ware decorating apparatus of invention in entirety;

FIG. 2 is a top plan view of FIG. 1;

FIG. 3 is an enlarged top plan view of the squeegee actuating yoke mechanism used in FIGS. 1 and 2;

FIG. 4 is an exploded side elevational view of FIG. 3;

FIG. 6a is a fragmentary, sectional view along line 6a–6a of FIG. 6;

FIG. 8 is an enlarged top plan view of the squeegee support mechanism of FIG. 5;

FIG. 9 is a front elevational view of FIG. 8;

FIG. 10 is a left end elevational view taken along line 10–10 of FIG. 9.

FIG. 11 is a right end elevational view taken along line 11–11 of FIG. 9;

Figure 5:
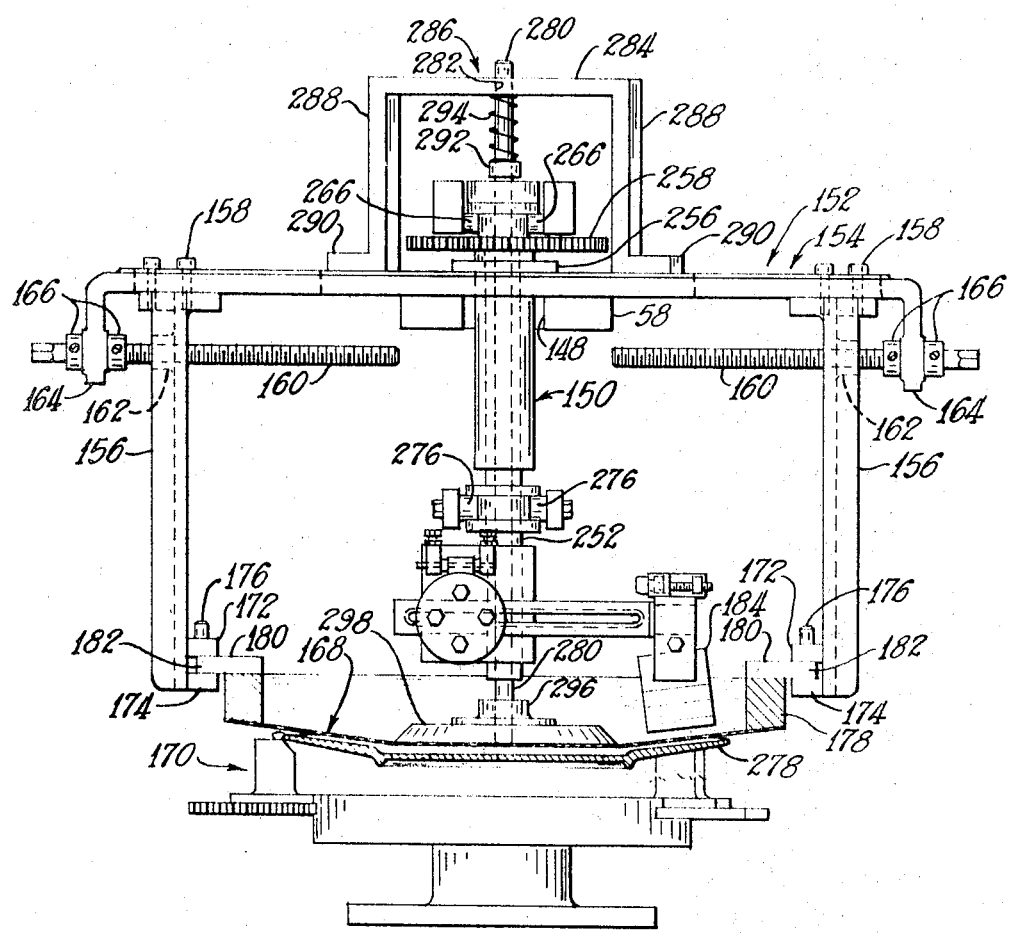
FIG. 5 is an enlarged, front elevational view of the silk screen and squeegee support mechanism as taken along line 5–5 of FIG. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

THE GENERAL ARRANGEMENT OF THE MACHINE

As shown in FIG. 1, the machine of invention is built on a frame 20 that is of elongated configuration. Opposed color application stations 22 are provided at each end of frame 20, 180° apart. Between the color application stations; there is a conveyor in the form of a turntable mechanism 24.

THE FRAME

Frame 20 is of fabricated steel construction and at each end comprises vertical legs 26 with horizontal runners 28 therebetween. Horizontal support members 30 extend outwardly in aligned relation from the tops of legs 26 and are braced by angularly disposed elements 32.

Horizontal runners 28 are of I-beam construction, with substantial webs between the flanges for appropriate rigidity and load support without flexure. These are effective to hold all units 22 and 24 in accurate alignment relative to one another.

GENERAL ARRANGEMENT OF COLOR APPLICATION STATION 22

Each station 22 comprises a support mechanism 34 for a vertically movable carriage 36. The carriage in turn supports a silk screen mechanism 38.

Support mechanism 34 includes a base casting 40 having a platelike body 42 and three triangularly spaced bosses 44. Bosses 44 are apertured to receive upstanding support columns 46. At the top, an upper casting 48 is also used to hold support columns 46 in alignment. This is a mirror image of base casting 40. Upper casting 48 is similarly provided with a body 50 and bosses 52 that are apertured to receive the upper ends of support columns 46. Columns 46 are suitably connected with castings 40 and 48 by lock bolts or welding, as desired. Although disassembly of the carriage 36 from the support mechanism 34 is not anticipated, this is readily effected by using lock bolts as a preferred form of assembly.

The vertically movable carriage 36 is a fabricated structure and includes three tubular slideway members 54 that are bored to slide on columns 46. Extending between members 50 are horizontal brace members 56 and 58. As indicated, slide members 54 and brace members 56 and 58 are suitably formed as a one-piece casting. However, the broad scope of invention includes a fabricated weldment comprised of parts 54, 56, and 58.

In order to support the silk screen mechanism 38 at the front of carriage 36, the brace members 56 and 58 have forward extensions as indicated. It will be noted that upper brace member 56 extends out a certain distance and that the lower, horizontal brace 58 extends beyond the forward end of the upper member. This puts the silk screen mechanism 38 out over the edge of turntable mechanism 24 and provides room for gear or speed reducer mechanism 60 to be supported between the silk screen mechanism 38 and the front columns 46.

In order to provide movement of carriage 36, a hydraulic cylinder assembly 62 is used. This has the base supported upon the upper surface of platelike body 42 of casting 40. The piston rod 64 extends upwardly to engage a squeegee actuating yoke mechanism 66 and then to lift the carriage 36 and equipment contained thereon.

Extending downwardly from the bottom surface of horizontal brace member 58 is a lifting pad 68. This is in direct alignment with piston rod 64 to receive the lifting force provided thereby and transmit such force into carriage 36. When piston rod 64 is extended upwardly, it will first move the yoke mechanism 66 upwardly to support the squeegee quill 252; then engage lifting pad 68; and thereafter lift carriage 36 in entirety.

Note a small space 70 between the bottom side of pad 68 and top side of yoke 66. This gives a two-stage lifting action as mentioned above.

From the foregoing, it will be evident that the upward travel of carriage 36 is provided by piston rod 64 reaching the limit of its travel.

Downward movement of carriage 36 is controlled by a stop rod assembly 72. This includes a rod 72, threaded at its upper end, as indicated, with the threaded end passed freely through smooth bore 74 in casting 48. At the lower end rod 72 is also threaded and turned into a threaded aperture 76, formed in the upper horizontal brace member 56. A lock nut 78 secures the bottom end of rod 72 in locked connection with the horizontal brace member 56. At the upper end, to establish the limit of downward movement, there is provided a lock nut pair 80. These are threaded on the upper end of rod 72 and locked to one another. When carriage 36 is lowered, the lock nut pair 80 moves downwardly and engages the top surface of upper casting 48 to stop the downward movement at an established operating position.

Before describing the details of the silk screen mechanism 38 and the manner in which it is driven by components including the gear reducer 60, it is pertinent to make the following comments:

An important aspect of the invention is that the squeegee by which the daub of ceramic color is forced through the silk screen and onto the surface of the ware operates in a particular manner. Thus, the sequence of steps to be performed is as follows:

a. Position ware by means of the surface to be printed.
 b. Lower screen, daub and squeegee to printing position.
 c. Start squeegee moving in the circular path in which the decoration is to be applied.
 d. Bring squeegee downwardly into printing contact with the screen while moving the squeegee, to force the screen into instant, incremental line contact with the ware, to apply the decoration pattern.
 e. Lift the squeegee while it is moving; it is lifted off the screen with a wiping motion, the same as that by which initial contact was made. This action returns the daub to its ready position.
 f. Lift carriage away from the ready position of screen, daub, and squeegee.

In order to perform these incremental movements in proper sequence, it will be evident that mechanism must be provided to move the squeegee relative to carriage 36. This is effected by means including a yoke mechanism 66. The details of yoke mechanism 66 are best shown in the enlarged views of FIGS. 3 and 4, inasmuch as FIG. 1 is not adequate because of the smallness and the concealment of some of the details behind forward support column 46.

YOKE MECHANISM 66

As shown in FIGS. 3 and 4, the mechanism 66 is made up of a primary yoke member 82, pivoted to carriage 36, and a secondary yoke 84, pivoted to the front end of the primary yoke.

Primary yoke 82 includes spaced parallel arms 86, separated at the rear ends by a bridge member 88, and at the forward ends by vertical wall 90. Also at the forward end, there is a horizontal wall 92 to receive the thrust of piston rod 64.

Referring back briefly to FIG. 1, it will be noted that horizontal wall 92 is placed directly over piston rod 64 to receive the thrust of cylinder 62.

At their rear ends, arms 86 are provided with pivot bosses 94 that are apertured at 96. Referring back again briefly to FIG. 1, note that it is by means of the bosses 94 and apertures 96 that the back end of primary yoke 82 is pivotally mounted to carriage 36. A boss 98 is formed on the front side at the bottom of the rear tubular slideway member 54. This is of a width to fit between the pivot bosses 94, as shown in FIG. 3. This is bored to receive pivot studs 100 that extend inwardly through the apertures 96 of primary yoke 82.

Referring to FIGS. 3 and 4, note that vertical sides 102 extend forwardly from transverse wall 90. Between these side members 102 extends a horizontal wall member 104. The purpose of this wall in holding stop rods and performing an abutment function will become apparent later.

At the forward ends of spaced parallel arms 86 are outwardly extending boss members 106. These are pivot bosses, and cooperate with similar, opposed bosses 118 on the secondary yoke member 84. The bosses 106 are each provided with threaded apertures 108. In order to provide clearance for the piston rod 64, represented by the phantom circle 64 of FIG. 3, individual pivot stub shafts are provided in each of the holes 108. These comprise bolt-type structures 110 that have bodies threaded for a portion of their lengths to be received in the threaded holes 108. The head ends of the shanks, however, are ground cylindrical and, thus, provide pivot portions 112 for the secondary yoke 84. Locking is provided when the cylindrical portion 112 abuts the threaded aperture 108. The units 110 have Allen heads for tightening.

Secondary yoke 84 includes spaced side arms 114 that are held in aligned and spaced relationship by a transverse bridge member 116. This unit, like primary yoke 82, is suitably fabricated as a casting, but the extended scope of invention includes a fabricated weldment. As will become evident later, bridge member 116 serves stop end spring force transmitting functions, similar to horizontal wall 104 of the primary yoke member 82.

At their inner ends, the arms 114 are provided with pivot bosses 118. These have smooth bore apertures 120 to receive the smooth body portions 112 of the pivot bolt means 110.

It will be evident on assembly, as indicated in FIGS. 3 and 4, that the bridging wall 116 will rest on the tops of the vertical side members 102 of the primary yoke 82. Thus, the bottom surface of the bridging wall 116 will abut the tops of the vertical side members 102. This will limit downward pivotal movement of the secondary yoke 84 relative to primary yoke 82. This abutting relationship or action takes place in a substantially horizontal or in an approximately planar aligned condition of the parts relative to one another. As will become evident later, however, a stop is provided to establish an adjusted, stopped position of the parts relative to one another.

The outer ends of arms 114 are also provided with pivot bosses 122. These are provided with smooth bores 124. The purpose of bores 124 is to establish a pivotal connection between the forward end of the secondary yoke 84 and part of the silk screen mechanism 38. This pivotal connection and its function in lifting and supporting the squeegee will be explained in further detail later.

THE REMAINING COMPONENTS OF THE SQUEEGEE ACTUATING YOKE MECHANISM 66

Prior to discussing in detail the silk screen mechanism 38, and the turntable mechanism 24, it is pertinent to point out the remaining components of the squeegee actuating yoke mechanism 66.

Referring to FIG. 1, note that a stop rod 126 has its upper end threadably secured within a threaded aperture (hidden), formed in the bottom surface of horizontal brace member 58. The upper end of stop rod 126 is locked in place by a nut 128.

The bottom end of rod 126 is also threaded and a pair of stop nuts 130 applied.

As shown in FIGS. 3 and 4, the wall 104 of primary yoke 82 is apertured at 132 to receive the lower end of stop rod 126 in slidable relationship. Note from FIG. 3 that the arms 114 of the secondary yoke 84 straddle the stop rod 126.

A spring 134 is positioned on the stop rod 126 between the upper lock nut 128 and the upper surface of horizontal wall 104 of primary yoke 82.

The stop rod assembly 126 and spring 134 are effective to force the primary yoke 82 downwardly to a bottomed or "home" position when all lifting force is dissipated from hydraulic cylinder assembly 62.

THE PRIMARY AND SECONDARY YOKE INTERLOCK MECHANISM

To force the primary yoke 82 and secondary yoke 84 to bottom or abut against one another, a biasing rod 136 is used. This rod has the lower end threaded. As shown in FIGS. 3 and 4, a threaded aperture 138 is formed in horizontal wall 104 of primary yoke 82 to receive the lower threaded end of the rod 136. The bridge member 116 of secondary yoke 84 is provided with a smooth bore aperture 140 to slidably receive the median portion of the rod 136. A spring 142 is placed around rod 136 between the head thereof and the upper surface of the bridge member 116 of secondary yoke 84.

Referring to FIG. 1, it will be evident that spring 142 biases rod 136 upwardly through the aperture 140, FIG. 4, and forces the forward end of primary yoke 82 and the bridge member 116 of secondary yoke 84 into contact with one another.

A stop mechanism is provided to establish an adjusted, stopped relation between these parts. This includes a stop bolt 144. The forward part of bridge member 116 is provided with a threaded aperture 146, see FIGS. 3 and 4, to receive the stop bolt 144. Stop bolt 144 has a wing nut head for manual adjustment. A lock nut sets the position of parts.

In operation, the bottom of bolt 144 abuts the upper, forward end of wall 104 of primary yoke 82.

This mechanism is used and preferred inasmuch as mere abutment of the upper surfaces of vertical sides 102 and the bottom of bridge 116 would not suffice for all operations due to differing thicknesses of ware capable of being processed by the present invention.

THE SILK SCREEN MECHANISM IN DETAIL AND ITS OPERABLE RELATIONSHIP ON VERTICALLY MOVABLE CARRIAGE 36 AND SQUEEGEE ACTUATING YOKE MECHANISM 66

THE SUSPENSION MECHANISM

This is best shown in FIG. 5.

Main support for this unit is provided by the forward end of horizontal brace member 58 of carriage 36. It will be noted that the forward end of brace member 58 is provided with a notch 148 through which a shaft assembly 150 of the silk screen mechanism 38 is extended.

Transversely of the forward end of horizontal brace member 58 there is extended a cross arm 152, across the top surface of member 58. It is upon this cross arm 152 that the silk screen mechanism 38 is supported, and from which it is operated. It is therefore important that the upper surface of brace 58 be parallel to the upper surface of turntable 24. It is also important that the upper and lower surfaces of cross arms 152 be parallel, accurate and true for proper alignment and functioning of the parts. As will become evident later, the ware to be decorated is supported parallel to the top of turntable 24 by chuck means. It is therefore necessary that the cross arm 152 be oriented parallel to the top surface of the turntable. Thus, if the silk screen mechanism is positioned truly transversely of the cross arm 152, it will also be automatically positioned to operate truly transversely to the turntable 24 and thus function properly relative to ware carried thereby.

From FIG. 2 it will be noted that the cross arm 152 is provided with longitudinal closed end slots 154. As shown in FIG. 5, downwardly extending arms 156 are dependably supported from cross arm 152. These are provided at their top ends with ribs (hidden) to fit within slots 154 and thus be oriented oppositely facing one another. Bolts 158, having heads sufficiently large to span the slots 154 are extended downwardly from the top side of cross arm 152, through the slots and into threaded apertures (concealed) at the top ends of arms 156. This provides support connection between the arms 156 and the cross arm 152.

Lateral adjustment of arms 156 is provided by screws 160. These are extended through apertured bosses 162, near the upper ends of arms 156. The apertures of bosses 162 are threaded so that turning of screws 160 causes arms 156 to be moved on the screws.

The outer ends of cross arm 152 are turned downwardly to provide bushing bosses 164. These are provided with smooth bores to receive the smooth outer ends of screws 160 in rotatable relationship. Collars 166 are provided on each side of bosses 164 and secured as by setscrews. Thus, the screws 160 are rotatable, but axially fixed. Due to the threaded relationship, however, between screws 160 and bosses 162 of arms 156, turning of the screws causes the arms 156 to be moved to the right or left according to the movement of either screw 160.

It will be evident from FIG. 5 that screws 160, therefore, provide means by which the silk screen 168, near the bottom of FIG. 5, can be adjusted to provide accurate register between it and the ware holding chuck 170, and, accordingly, the ware 278 carried thereby, both chuck and ware being carried by the turntable mechanism 24, FIG. 1.

At the bottom ends of arms 156, there are provided parallel lugs 172 and 174. Through each of the upper lugs 172 are passed setscrews 176.

Silk screen 168 is carried by an annular frame member 178. This member has an annular top flange 180 that extends beyond the periphery of frame member 178 to provide a support lip 182 that slips between the lugs 172 and 174.

To clamp the silk screen 168 in place, arms 156 are first moved outwardly an appropriate distance, bolts 158 first being loosened, and then screws 160 appropriately turned. With the setscrews 176 backed up, the lip 182 is put in properly aligned relationship and the arms 156 brought together again. When appropriate adjustment of arms 156 has been made, they are locked in place by tightening bolts 158; then the setscrews 176 are secured.

From the foregoing, it will be evident that different sizes of silk screens can be utilized, depending upon the diameter of ware being decorated. Further, as will become evident later when the chuck mechanism is described, it, too, is capable of accepting different sizes of ware by adjustment means contained therein.

It will be evident from the foregoing description that the silk screen remains stationary when the ware is decorated. Only the squeegee 184 turns during the printing operation.

The manner in which the squeegee turns as it presses the daub of color through the screen will now be described. Further, the immediately following description will point out the exact manner in which the squeegee is moving both when it touches the screen and leaves the screen, to move the daub of color through the screen and, simultaneously, the screen into printing engagement with the ware. In short, the squeegee is moving when it initally touches the ware for printing and leaves the ware as it is moving. By operating with such a wiping action, a complex pattern can be applied without streaks or runs where the ends of the pattern come together to complete a circle.

THE SQUEEGEE ROTATING AND LIFTING MECHANISM

Figure 6:
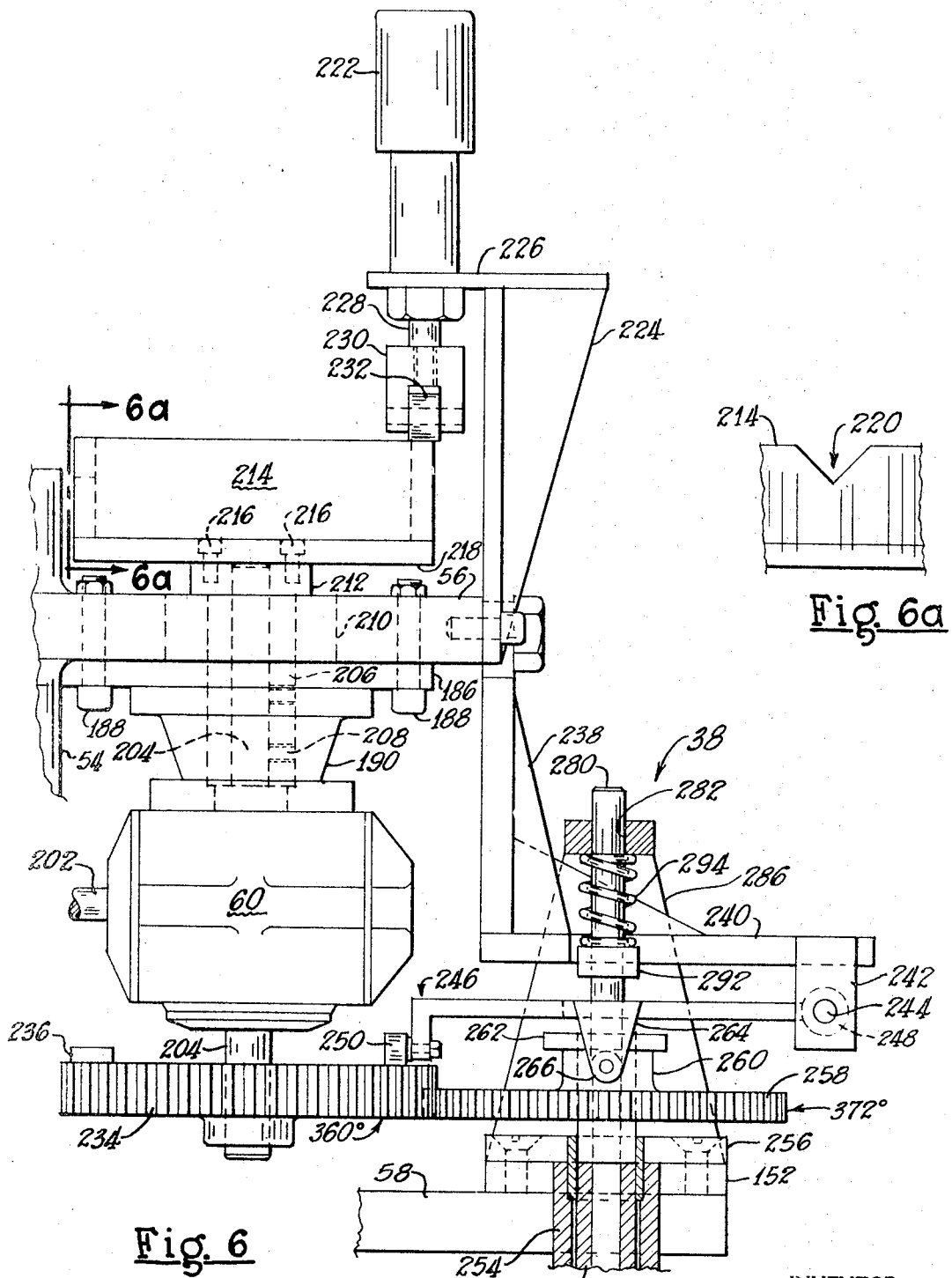
FIG. 6 is a greatly enlarged, fragmentary, side elevational view of the speed reducer, holding cam, and gear drive and lift mechanism for the squeegee, as used in FIGS. 1 and 2.
Figure 7:
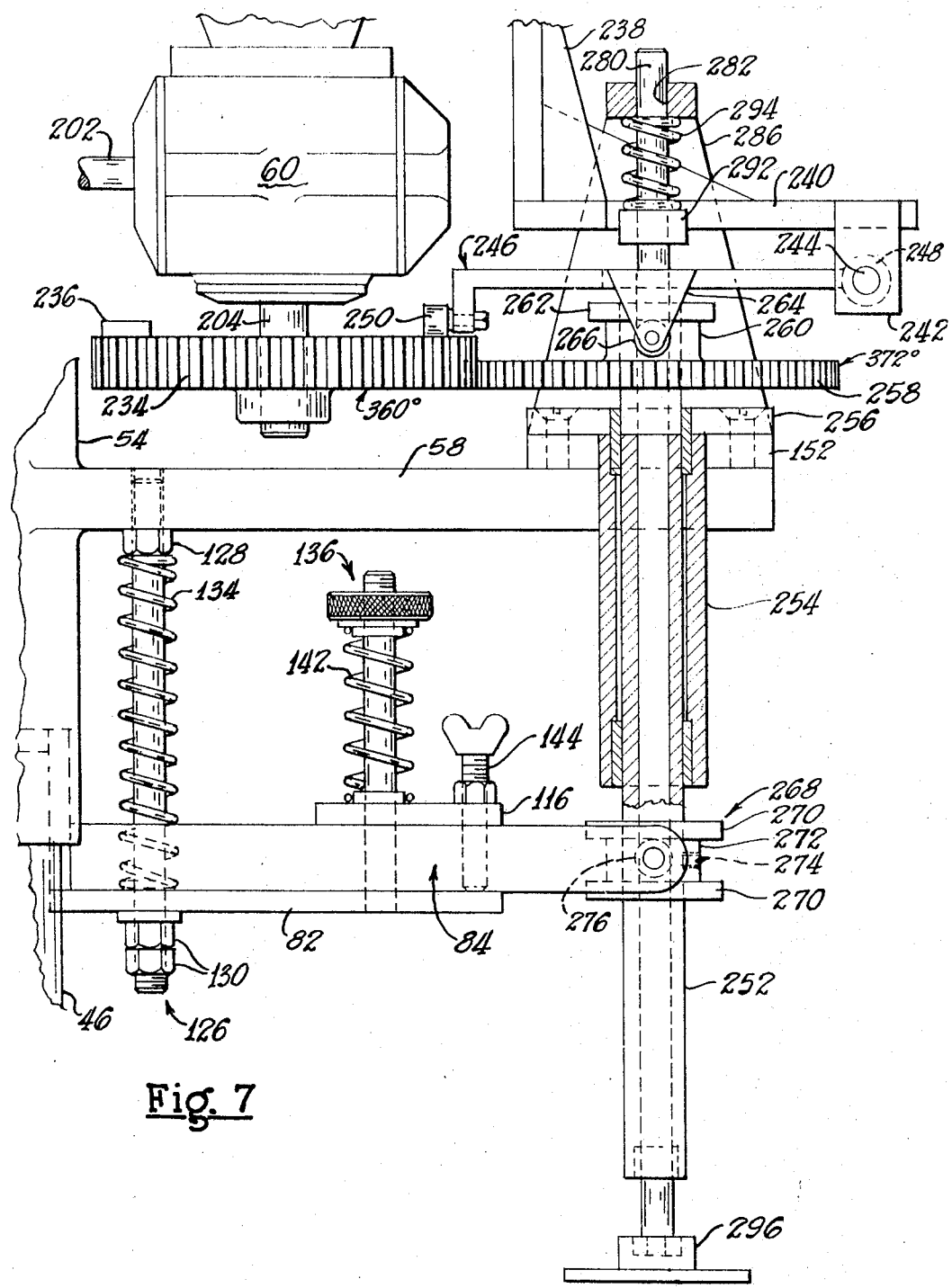
FIG. 7 is a greatly enlarged, fragmentary, side elevational view of the support mechanism for the squeegee collett, as used in FIGS. 1 and 2.

FIGS. 6 and 7 show, in greater detail, the gear reducer 60 and the manner in which it is suspended in space. To the bottom side of the front end of horizontal brace member 56 there is fastened a bracket member 186. The fastening is effected by bolts 188 that pass upwardly through apertures in the bracket member 186, and also through apertures in the forward end of the horizontal brace member 56. An adapter 190 is welded at its top end to the bottom side of bracket 186. At the bottom, the adaptor 190 is welded to the top of the speed reducer 60.

The reducer 60 is driven by a motor 192, FIG. 1. An air motor is here disclosed specifically, but this could be electric or other. This is mounted on the back end of bracket 186. An angle adaptor 194 is fastened to the forward end of the case of the motor 192. This has a foot 196 that is connected suitably by bolts to the foot 198 of bracket 186. By so operating, a degree of adjustability is provided for accurately aligning the shaft 200 of motor 192 with the input shaft 202 of gear reducer 60.

Now referring back to FIG. 6, note a transverse output shaft 204 extending from speed reducer 60 upwardly into an adapter sleeve 206. The two parts 204, 206 are fastened together by means of setscrews 208. Adapter sleeve 206 extends upwardly through an aperture 210 of horizontal brace member 56. The top of adapter sleeve 206 is formed as an annular ring 212. The purpose of the annular ring is to provide support and fastening means for a circular cam 214. Bolts 216 pass down through the bottom wall 218 of cam 214 and into the annular ring portion 212 to hold the cam in place.

The purpose of cam 214 is to provide a positive stop or point of reference during operation of the device. For this purpose, the top edge of the cam 214 is provided with a cam notch 220, FIG. 6a. Detent mechanism in the form of a solenoid 222 cooperates with the notch 220. A bracket 224 is bolted to the forward end of horizontal brace 56 and the solenoid 222 is fastened to the top plate 226. Solenoid 222 includes a plunger 228. A yoke 230 is fastened to the free end of plunger 228 and a roller 232 is journaled on a shaft extended between the arms of the yoke.

When cam notch 220 comes into alignment with roller 232 and the solenoid 222 is de-actuated so that the spring-biased plunger 228 moves into notch 220, the cam will be held by the roller 232 against further movement until the solenoid is actuated to remove the roller from the notch. This is effective to hold the output shaft 204 of gear reducer 60 accurately in this spot as a reference point for actions to be later described.

The bottom end of output shaft 204 carries a gear 234. In the future, this gear will be referred to as a 360° gear, the reason being that while it makes one revolution, a gear 258, driven by it, travels a total of 372°. Gear 234 carries a cam block 236 on its upper surface. Cam block 236 has an effective length of 12° of rotation.

This is the basic driving power for rotating the squeegee 184. However, before showing the manner in which the driving force is transmitted to the squeegee, the manner in which the squeegee is mounted and rotated will first be described.

THE SQUEEGEE SUSPENSION

By reference to FIGS. 6 and 7, it will be noted that a bracket 238 is fastened at its top end to the forward edge of horizontal brace member 56. Bracket 238 has a lower leg 240 that extends forwardly and is provided at its front end with pivot blocks 242. These are bored for pivot studs 244.

A lifting yoke 246 is pivoted at its forward end on the pivot studs 244. The forward ends of each of the arms of the yoke 246 are provided with enlarged bosses 248 that are bored to accommodate the pivot studs 244.

The rear end of lifting yoke 246 has a cam roller 250 rotatably mounted thereto. This cam roller engages the upper surface of the drive gear 234 and is in alignment to ride up and over the cam wedge 236 during rotation of gear 234. This provides a lifting action for squeegee 184, as will become apparent.

The squeegee mechanism is mounted on the bottom end of a tubular quill 252. This quill is journaled within a tubular quill adapter 254 that has an annular flange 256 at the top end. The flange is fastened to the top surface of cross arm 152, FIG. 5, with the body of the quill adapter extending through an aperture in the center of the cross arm.

The importance of the trueness of the upper surface of the horizontal brace member 58 and the upper and lower surfaces of cross arm 152 are now becoming sharply apparent. These are vital to the alignment and true operation of the cooperating parts of this machine.

At the top end, quill 252 carries a driven gear 258. Hereafter, this gear will be referred to as a 372° gear because it is slightly smaller than gear 234 in order to be turned 372° while gear 234 turns only one revolution, or 360°. The 12° lift provided by cam block 236 of gear 234 produces a lift that is effective to leave the squeegee in contact with the silk screen during exactly 360° of its 372° rotation.

Note that gear 234 is thicker than gear 258. This permits gear 258 to move vertically while nonetheless remaining in engaged relationship with the drive gear 234.

Gear 258 is fastened to the top end of quill 252 by a setscrew or equivalent. A hub member 260 extends upwardly from gear 258 and has an outwardly extending annular flange 262 at the top. This provides a lift lip or ring for gear 258 and quill 252.

Centrally, the arms of lift yoke 246 are provided with journal blocks 264 that rotatably carry rollers 266. As shown in FIG. 5, there is one roller 266 at each side. The free ends of rollers 266 fit under the flange 262 and thus provide support for gear 258 and the quill 252 which it carries and rotates.

DOWNWARD BIAS ON THE QUILL 252 AND THE SQUEEGEE

Beneath the bottom end of quill adapter 254, there is fitted onto the quill 252 a roller race 268. This is a sleeve-like structure having upper and lower flanges 270 with a smaller body portion 272 therebetween. A setscrew 274 secures roller race 268 to the quill 252.

Now refer back for a moment to FIG. 3 and observe the opposed rollers 276, carried at the free ends of arms 114 of secondary yoke 84. Back now to FIG. 7, note that these rollers 276 embrace the body portion 272 of roller race 268.

It is through this mechanism that downward bias is imposed on the quill 252 at all times so that when the roller 250 of lifting yoke 246 drops off cam block 236, the quill 252 and the squeegee which it carries will be instantly powered downwardly.

By looking at the lower left portion of FIG. 7, the forward end of silk screen actuating yoke mechanism 66 can be observed in full detail. Also by looking at FIG. 1, the interrelationship of this mechanism to the overall remaining portions of the machine can be readily understood.

First, presume that the lift cylinder 62 of FIG. 1 is exhausted. This permits the spring 134 around stop rod 126 to force the outer end of the primary yoke 82 downwardly. This causes it to bottom on the stop nut pair 130 in a "home" position.

Referring back now to FIG. 7, note that spring 142, carried by biasing assembly 136, forces the bridge member 116 of secondary yoke 84 downwardly. Stop bolt 144 establishes "-home" position. This is the position where the squeegee forces the silk screen 168, FIG. 2, into instantaneous line contact with the ware 278.

This action, however, takes place after the screen 168 has been dropped to a printing or "ready" position by being lowered with lowering movement of carriage 36.

THE SILK SCREEN BIAS

In order to keep the silk screen 168 in a taut or tensioned condition, a bias is applied over the central portion through the mechanism of an internal tension shaft 280. This shaft is rotatably journaled within the tabular quill 252 and is freely slidable axially therein.

At the top end, biasing shaft 280 extends through a hole 282 in the bight portion 284 of an inverted U-shaped bridge member 286. The configuration of bridge member 286 is best shown in FIG. 5 and, in addition to the bight portion 284, includes legs 288. This unit is cocked, as shown in FIG. 2, to straddle the closed end slots 154 running down the center of the cross arm 152 and is secured by bolts (not shown) through the feet 290 that pass into the cross arm.

Ordinarily, the weight alone of tensioning shaft 280 is sufficient to hold the silk screen down with an operable tightness. However, if desired, a collar 292 can be applied, with a spring 294 between the collar and the underside of the bight portion 284 of bridge member 286.

At the bottom, the tension shaft 280 is fitted with a plate adapter 296 to spread the weight over an enlarged central area of the silk screen 168. As shown in FIG. 5, a round disc or foot 298 is attached beneath the adapter 296. This spreads the force of tension rod 280 to the periphery of the bottom of a piece of ware 278, as indicated in FIG. 5, and thus places the silk screen in a proper configuration for printing.

THE SQUEEGEE SUPPORT ARM

This unit is shown in detail in FIGS. 8—11, inclusive, and in FIG. 5 as attached to the machine.

As mentioned above, this unit is supported from the lower end of quill 252. To provide connection to the quill, therefore, the body member 300 is provided at the back with a split ring 302, FIG. 8. A bolt 304 passes through the opposed lips 306 of ring 302. When the bolt is tightened, the ring 302 is clamped upon the quill 252 and, thus, the position of body 300 is established. Note further that this establishes fixed relationship of the body 300 and quill 252 so that when the quill rotates, the body 300 and the squeegee mechanism carried thereby also rotate.

Body portion 300 is of block-like configuration and has a round, shallow open cavity 308 exposed on the forward side. As shown in FIG. 10, a round gear yoke 310 fits into cavity 308. Gear yoke 310 has a rearwardly extending stud 312 that passes through aperture 314 of body 300. The stud 312 has a portion projecting beyond the rear of body 300 and is threaded to accept a nut 316. Tightening of nut 316 locks the gear yoke in position. Slackening of the nut 316, however, permits adjustable rotation of yoke 310.

An indexing gear 318 is fastened to the front side of yoke 310. For this purpose, upper and lower bolts 320 are passed through appropriate holes in the gear 318 and into threaded apertures formed in yoke 310.

In order to index the gear yoke 310 and gear 318 as desired for vertically adjusting the position of the squeegee, an adjusting gear or screw 322 is provided. Bushing blocks 324 extend forwardly from the front side of body 300 and are provided with elongated apertures 326 that receive the ends of a shaft 328 on which the adjusting screw is mounted in locked relation. Assembly of screw 322 and shaft 328 to bushing blocks 324 is effected by pushing the shaft through first one bushing block, then one spacer 330, then through the gear 322, and then the other spacer 330 and the other bushing block 324. The gear is then made fast to the shaft 328. Thereafter, lock bolts 332 are brought down to lock the shaft 338 and gear 322 against rotation. This is also effective to snug the adjusting gear 322 down into firm and locking engagement with the indexing gear 318.

By reference to FIG. 10, note that the left hand end of the shaft 328 has a square end 334 to accept a wrench for adjustment.

The squeegee support arm 336 is of elongated configuration as shown in FIGS. 8 and 9, and is of generally rectangular section as shown in FIG. 10. It is essentially a bar, but with a closed end slot 338 that enlarges stepwise at the back to accept the head 340 of bolts 342. The bolts 342 are extended forwardly through appropriate holes in gear 318, and tightened by nuts as indicated.

By this arrangement, squeegee arm 336 can be positioned laterally relative to gear 318 for decorating different diameter ware.

At the free end, squeegee arm 336 is formed as a cylindrical stud 344. This is embraced by an aperture 346 of the squeegee block body 348 and permits the body to be rotatably adjusted as necessary. The squeegee block body 348, as shown in FIG. 11, is split along one side of aperture 346 and provided with a tightening bolt 350. It can thus be clamped on stud end 344 of arm 336 in an adjusted position, and adjustment can be made readily from the front.

The squeegee 184 can be pivoted relative to body 348 for very accurate positioning relative to the ware. This is effected through a squeegee support plate 352 fastened to the back of body 348. A bolt 354 is passed through the support plate 352 and into a threaded aperture of body 348. When bolt 354 is loosened, plate 352 is free to rotate.

Rotation of plate 352 is effected by a screw 356. This screw rotates freely at the head end in a bushing block 358. At the other end, the bushing block 358 is rotatably journaled in a pivot block 360, extending upwardly from the body 348.

A stud plate 362 has one end pivotally mounted to the block 352. At the other end, it has a threaded bore 364 to receive the threaded body of the adjusting screw 356. Screw 356 has a knurled head 366 for very delicate hand adjustment of the screw 356 and, accordingly, the tilt of squeegee 184. When the adjustment is made, bolt 354 is locked to set the adjusted relationship of the parts.

The squeegee 184 comprises a sheet of rubber 368 clamped between two metal plates 370. A rivet 372 is used for fastening at the bottom. At the top, a bolt 374 is passed through the squeegee assembly 184 and into the bottom of the back plate 352. As a usual thing, the squeegee 184 remains fixed relative to the block 348, and the block is moved by hand adjustment of the knurled bolt head 366 for very fine adjustments. This is done rather than to attempt to make an adjustment of the squeegee by manipulation of the squeegee itself, as by loosening bolt 374 and then re-tightening.

As a summary of the foregoing, the reader is now invited to visualize the adjustability of the squeegee by observing the manner of mounting in FIG. 5 and the way it is carried for rotation at the bottom of quill 252.

THE TURNTABLE

As best shown in FIGS. 1 and 2, this assembly is mounted on the horizontally disposed runners 28 of frame 20. Enclosed within a casing 376 is an intermitter mechanism. Power is derived from clutch and brake motor 378. A drive belt 380 laps the output shaft pulley 382 of the motor 378 and the input shaft pulley 384 of the intermitter mechanism 376.

A large spindle 386 protrudes from the top of the housing 376 and an adapter plate 388 is fastened to the top side of the spindle. The turntable proper is designated 390 and is secured on the top side of the adapter plate 388.

INDEXING THE TURNTABLE MECHANISM

It is very important that the chucks 170 stop exactly in axial alignment beneath the printing stations 22. It will also be understood that 180° accurate indexing is required between stations 1 and 2, where the colors are applied, since these stations are exactly 180° apart.

In the present invention, the turntable drive 378 actually operates constantly; and is interrupted by clutch and brake to stop at exact 90° increments plus or minus 0.1°.

A limit switch on the intermitter mechanism 376 is used to open the solenoid on a four-way valve to lower the lifting piston 62. A microswitch on the circular cam 214 is effective to raise the piston again and lift the mechanism 38 away after the decorating operation is completed. This is followed by sequencing of the table 90° as the result of a microswitch that is actuated on lifting of the carriage 36.

In the extended scope of invention, this could be a Geneva-type drive to provide the indexing accuracy.

Also within the extended scope of invention, detent notches could be provided on the turntable for each chuck, and these set to operate exactly 90° apart, or as necessary for a greater chuck capacity machine. A detent plunger could be provided on the frame of the machine to engage the notches successively. This is so positioned as to index the turntable so that the turntable stops with the chucks exactly at the printing stations.

With the printing stations 22 exactly 180° apart, accurate register of colors in a multiple color overprinting operation would be assured.

THE CHUCK

It is upon the turntable 390 that the chuck mechanism 170 is mounted. This is a very important part of the present invention and functions in a novel manner to automatically center the ware by way of the top or upper surface thereof as a reference plane. The chuck mechanism also embodies a unique snap-type centering function which will become apparent as the description progresses further.

The manner in which the chuck 170 is axially aligned with the quill 252 of silk screen mechanism 38 is vividly shown in FIG. 5.

As shown in FIG. 2, four chuck mechanisms 170 are employed in this particular machine wherein automatic application of two colors is effected sequentially with a quick-dry being possible at a third station, between the first and second color application stations. The fourth station will hereinafter be referred to as a loading and unloading station.

It should be mentioned that while the chuck 170 is illustrated herein for operation with an automatic turntable mechanism 24, it is equally applicable to a single station machine, such as including one station 22, for application of a single color followed by the old-fashioned type of drying and goods-in-process operation. Therefore, the extended scope of invention is to be considered to cover such a contingency and the chuck therefore capable of being able to stand per se.

Figure 12:
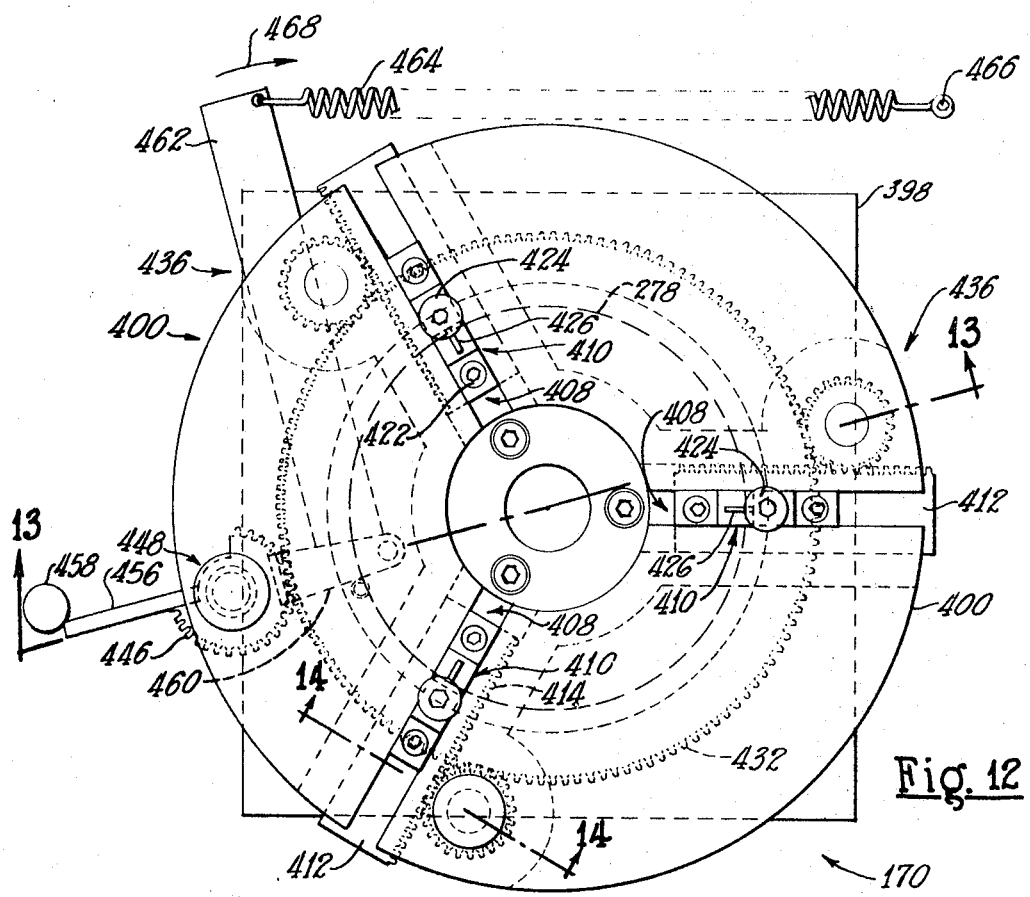
FIG. 12 is an enlarged top plan view of the ware holding chuck as used in FIGS. 1 and 2.
Figure 13:
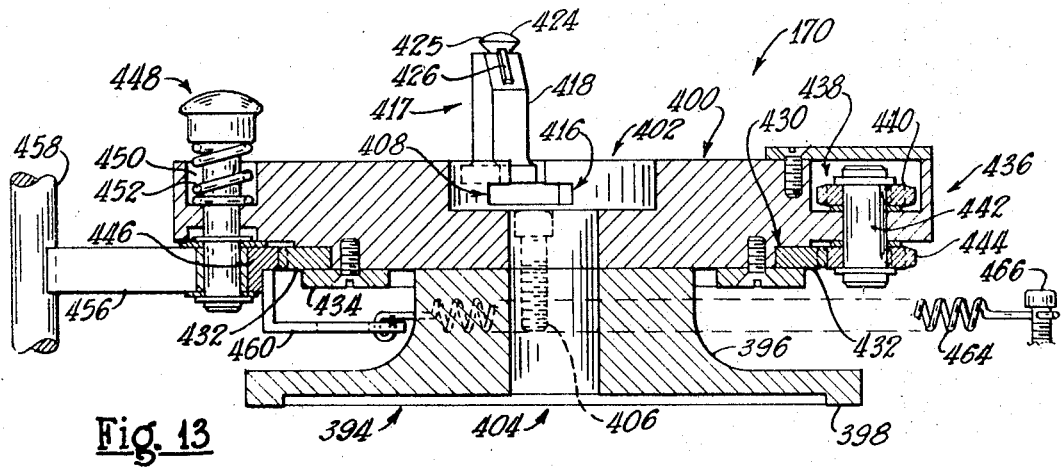
FIG. 13 is a sectional view taken along line 13–13 of FIG. 12.

The chuck is illustrated in full detail in FIGS. 12—15 inclusive. As shown in FIG. 13, the chuck 170 includes a pedestal-type base 394, flaring from a central column support 396 outwardly to an enlarged foot element 398 for maximum stability. The chuck table 400 is round, as shown in FIG. 12. At the center is a stepped hole 402, axially aligned with a hole 404, formed in the base 394. Alignment of the parts in machining is effected by reference to the holes 402 and 404.

In the shoulder of hole 402, there are tapped holes receiving bolts 406 that extend through the table 400 and into the base 394 to make these parts fast to one another.

As shown in FIG. 12, three guideways 408 radiate outwardly from the center of the table 400, being separated from one another by 120°. In these guideways 408, ware holder assemblies 410 are mounted for accurate lineal movement, toward and away from the axis of the chuck table 400.

Figure 15:
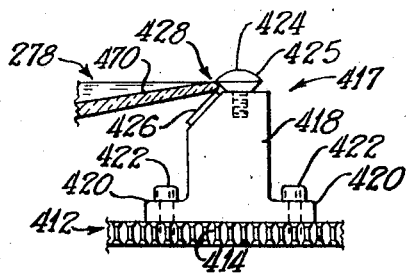
FIG. 15 is a side elevational view of a ware holder head, used in the chuck of FIGS. 12 and 13.

Each ware holder assembly includes a base plate 412, FIGS. 12 and 15, having a gear rack 414 along one side, by which it derives its lineal moving force. The base plate 412 is an accurate sliding fit in the enlarged bottom portion 416 of the guideways 408, FIG. 13.

The ware holder head 417 is shown in side elevational view in FIG. 15, and includes a body 418 with feet 420 at the front and rear. Bolts 422 are passed through the feet 420, as indicated in FIGS. 15 and 12, and into the base plate 412. Accuracy of sliding fit between the sides of the body 418 and the sides of the upper portion of the guideways 408 provides further accuracy for lineal movement of the ware holder assembly 410.

To the top of the body 418 of each ware holder head 417 there is fastened a centering jaw button 424. This has a flared head with an apex rib 425 around the circumference. The body is threaded on the lower shank portion and this is run into an appropriate threaded aperture in the top of body 418.

A hard, wear-resisting slide member 426 is secured within an appropriate slot formed into the front sloping face of the body 418.

The manner in which the periphery 428 of ware 278 is snugged beneath the peripheral apex rib 425 of the centering button 424 at the upper surface of the slide member 426 is evident from FIG. 15.

At this point, it should be stated that subsequent description will bring out the manner in which the ware holder heads 417 are moved inwardly toward the axis of the chuck with a quick snap action to "click" the ware and cause it to shake or vibrate automatically to an accurately indexed position on the chuck 392 between the three ware holder heads 417.

By reference to FIG. 13, it will be noted that the periphery of the chuck table 400 is provided with an annular notch 430 in which is movably mounted a ring gear 432. An annular retainer 434 lies against the bottom of the table 400 and is held in place by screws, as indicated. The notch 430 is slightly deeper than the thickness of the ring gear 432 to permit rotary movement of the gear relative to the table 400.

As shown at the right hand side of FIG. 13 and also in FIG. 12, a sun gear assembly 436 is provided adjacent each of the guideway systems 408 to receive power or motion from the ring gear 432 and, in turn, to transmit that power or motion into lineal movement of a ware holder assembly 410. A cavity 438 is provided in the top of table 400 adjacent each of the three guideways 408, FIG. 12. These receive the upper gear 440 of a sun gear assembly 436. A connecting shaft 442 extends through upper gear 440 and down through an aperture in the table 400. The lower gear 444 is fastened to the bottom end of the shaft 442. Both gears 440 and 444 are locked to the shaft 442. As is evident, the lower gear 444 engages ring gear 432; and the upper gear 440 engages the teeth of gear rack 414 along one side of each ware holder assembly 410.

THE ACTUATING MECHANISM FOR MOVING THE WARE HOLDER ASSEMBLY 410

As shown in FIGS. 12 and 13, a sector gear 446 is positioned in peripheral contact with ring gear 432. The sector gear is mounted on a vertically movable pin member 448. A stepped hole 450 is formed in the table 400 and the restricted portion thereof slidably receives the body of the pin 448. A compression spring 452 is placed beneath the head of the pin 448 and the shoulder or restricted portion of hole 450. Gear 446 is freely rotatable on the pin, else if the pin rotated, freedom of movement would be hampered by the resistance of spring 452.

Note that the toothed portion of gear 446 is of the same thickness as ring gear 432, and that the plunger 448 can move the sector gear downwardly a sufficient distance to disengage it from the periphery of the ring gear 432. The reason for this movement is to provide adjusted positions of the ware holder assemblies relative to one another to accommodate different sizes of ware.

Figure 14:
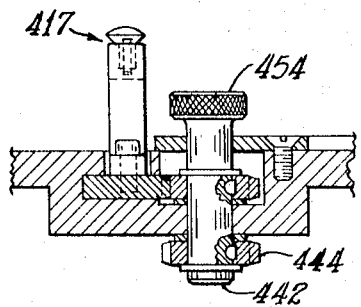
FIG. 14 is a sectional view taken along line 14–14 of FIG. 12.

As shown in FIG. 14, one of the sun gear assemblies 436 has the shaft 442 extended upwardly and formed as a knurled handle 454 for manual adjustment. It will be evident that if the sector gear 446, FIG. 13, is disengaged by depressing the handle 448, the knob 454 of FIG. 15 can be rotated to set the ware holder assemblies 410 in adjusted position relative to the center of the chuck table 400. This is effected by rotating the ring gear 432 and thereby moving all heads 418 simultaneously in or out relative to the center of the chuck.

THE ASSOCIATED PARTS OF THE SECTOR GEAR 446 FOR MOVING THE WARE HOLDERS

In FIGS. 12 and 13, a lever 456 is fastened to the body of the sector gear 446 by suitable means, and this lever extends radially outwardly beyond the periphery of the chuck table 400. Lever 456 has its free end positioned in striking alignment with a dog roller 458, fastened to the frame of the machine or otherwise suitably supported in such striking engagement with the lever 456. It will be evident that as the chuck 170 is moved by the turntable 390 of FIGS. 1 and 2, the lever will swing the gear 446 counterclockwise when it is moved backwardly by engagement with the dog roller 458. This will cause the ware holders 410 to move radially outwardly from the center of the chuck table by counterclockwise rotation of the sun gear assemblies 436; this is the same movement as that of sector gear 446: all movements are simultaneous through the ring gear 432.

RETURN BY SNAP ACTION

When the lever 456 passes the dog roller 458, it will be released.

As shown in FIG. 13, a lever arm 460 is connected at one end to the lower body portion of sector gear 446. The horizontal member of lever arm 460 has an elongated biasing arm 462 secured thereto, FIG. 12. The free end of lever 462 is connected to one end of a spring 464. The captive end of the spring 464 is fastened to post means 466, secured to the top of turntable 390.

It will be evident that the bias of spring 464 is in the arrow 468 direction. The result of the bias of spring 464 is to turn the sector gear 446 in a clockwise direction and, thus, the ring gear 432 in a counterclockwise direction; and all sun gear assemblies 436 in clockwise direction. This action is effective to drive or bias the ware holder assemblies 410 toward the center of the chuck table 400 to grip the ware.

SUMMARY OF OPERATION OF THE CHUCK

During operation of the chuck mechanism 392, the following steps take place:

1. Lever 456 engages the dog roller 458 as the chuck is moved by the turntable 390 to a given position. For purposes of discussion, presume that station 4, FIG. 2, has the dog roller 458 located close by. Station 4 shall be designated as the "operator load and unload station" where decorated ware is removed from a chuck because the chuck jaws are opened at that point, and the new ware to be decorated is replaced in the chuck in place of that removed. Dog roller 458 is positioned so that the end of the lever 456 engages it to be moved counterclockwise a sufficient distance to open the ware holder assemblies 410 radially outwardly of the chuck table 400 just a sufficient amount to clear the edge 428 of the ware.

This condition permits the operator to unload the decorated piece, now resting loosely on wear pads 426; then position a new piece on the wear pads 426, with the periphery of the ware inside all three centering jaw buttons 424. This is shown by the dotted outline of a piece of ware 278 in FIG. 12.

2. The mechanism is then sequentially actuated to move the turntable 90° and transport the new piece of ware to station 1, as viewed in FIG. 2. As the chuck at station 4 begins to move, lever 456 moves out of contact with dog roller 458. This frees the spring 464 for action to snap the elongated biasing arm 462 in the arrow direction 468 of FIG. 12. This snap action is imparted to lever arm 460 and sector gear 446 is also snapped clockwise, as viewed in FIG. 12.

The effect is a quick, but gentle snap action of the ware holder assemblies 410 radially inwardly of the chuck table 400. This action is effective to joggle and shake the ware and cause it to settle to an accurately centered position between the ware holder heads 418, FIG. 14.

By reference to FIGS. 5, 12, and 15, it will be observed that the ware 278 is held at three points by the very periphery 428 of the rim, between ware-resistant slide members 426 and centering jaw buttons 424. This can be explained as orienting the ware by the upper surface 470, i.e., the surface to which the decoration pattern is to be applied.

The present invention, therefore, provides a unique step forward in the art by supporting the ware by the surface to be decorated. Therefore, problems of the prior art have been eliminated as inherent in the prior practice of orienting ware by its bottom surface or base. As discussed above, ware both shrinks and tends to warp during the drying operations in its initial formation; accordingly, the base and decorating surfaces do not remain true and parallel relative to one another.

It is substantially impossible because of this fact to machine-decorate ware by orienting the ware, using its bottom surface as a point or surface of reference.

This important feature of the invention may be stated otherwise: as orienting the ware by the "plane of decoration."

THE METHOD OF INVENTION

In view of the foregoing description of the apparatus of invention, it is believed that a method also clearly evolves from the invention. This will now be described, with reference being made to the apparatus of the prior description as necessary, but not so limited, for the functions of the method.

THE METHOD: PERSPECTIVE VIEW

The method steps involved in the present invention have been listed above briefly as follows:
a. Position ware;
b. Lower screen, daub, and squeegee to ready position;
c. Start squeegee moving;
d. Bring squeegee down into contact with screen;
e. Lift the squeegee and return daub to ready position;
f. Lift the carriage free of the ware.

These steps are now elaborated in view of the completed description above, in order to bring out all subtleties of the method in a crisp and clear manner so as to be clearly understood by the reader.

THE METHOD ELABORATED

Step I: Positioning The Ware By Means Of The Surface To Receive The Decoration This is effected by supporting the ware at three spaced points on the periphery and by actually touching or holding the ware by the periphery of the surface to be decorated.

Step II: Screen, Color Daub, And Squeegee Lowered To Printing Or "Ready" Positions As regards the silk screen "ready" position, this is shown in FIG. 5. The distance of the screen above the ware is just sufficient that the screen is clear of the upper surface of the ware which is to receive the decoration. By application of squeegee pressure later, the screen is moved downwardly across the remaining gap and forced into contact with the ware as the squeegee passes over it in instantaneous line contact.

Then the screen instantly springs back, as the squeegee passes, to its "ready" position just above the ware. This makes a clean print and avoids smearing of the daub.

THE DAUB "READY" POSITION

The daub of ceramic color is a pastelike mass that hangs on the forward, lower functional edge of the squeegee. Actually at this point in the process, the daub is in actual contact with the upper surface of the screen and ready to be forced through by the squeegee and onto the surface of the ware. However, at this instant, there is no infusion of the daub or color through the screen because motivating force for such is absent by the fact that the squeegee is above the screen in its "ready" positions.

THE SQUEEGEE "READY" POSITION

At this instant, movement of the carriage 36 downwardly has also brought down the squeegee to its ready position. The squeegee is just off or above the upper surface of the screen, as shown in FIG. 5. This is due to the fact that the cam block 236 of FIGS. 6 and 7 is under the lifting roller 250 of yoke 246.

STEP III: Squeegee Starts Moving

As the squeegee begins moving in its circular printing path, it is off the screen. The cam block 236 of FIGS. 6 and 7 effects this condition of parts. It remains off the screen for about 6° of travel, that is, while traversing the latter half of cam block 236.

Step IV: Squeegee Lowered to Print the Daub

As the squeegee is moving, it is brought down with a wiping action or motion into printing contact with the screen. As the cam roller 250 leaves the cam block 236, this takes place. This is effective to push the screen into instant, constantly changing incremental line contact with the decorating surface of the ware. At the same time, the daub is forced through the screen or printed at the instantaneous incremental line of contact. This transfers the daub through the screen as a pattern accurately to the surface of the ware, and without smearing.

Step V: Squeegee Lifted to Ready and Daub Reverted to Ready

With the same type of wiping action with which the squeegee came into initial contact with the screen, it is lifted from the surface of the screen. This is effective to revert the daub to its ready position, i.e., just lying in contact with the upper surface of the screen 168, but with squeegee force absent. This prevents the daub from being infused through the screen. Further, the screen 168 is out of contact with the ware by the release of the squeegee therefrom. This lifting action, by reference to FIG. 1, will be noted to be effected by the cam block 236 coming beneath roller 250 of lift yoke 246. This lifts quill 252 carrying the squeegee, but does not lift the screen or change the tension on the screen imposed by the tension rod 280 through the foot or disk 298. This is effected by the fact that the silk screen mechanism 38, including quill 252 and associated apparatus, floats relative to the lift carriage 36.

Step VI: Carriage 36 Is Lifted by the Cylinder 62

Cylinder 62 is now sequenced. As it moves the piston rod 64 upwardly, the top end of the rod first contacts the horizontal wall 92 of primary yoke member 82. This lifts the secondary yoke 84 to take up the "clearance" or slack provided for freedom of action of the squeegee through the actuation of the cam block 236, roller 250, and lift yoke 246 mechanism, shown in FIGS. 6 and 7. The clearance or slack is provided for the free movement of the quill 252 during the actual printing operation.

When the "slack" is taken up, the upper surface of the wall 92 abuts the bottom of the lift pad 68, FIG. 1. Thereafter, the entire carriage 36 and all components supported thereby are lifted to a "clear" position above the ware.

REPEAT CYCLE

Thereafter, the turntable is sequenced to move 90° for the purpose of a station change and to advance the processing of further ware.

At this point in the description, it could well suffice to say that the proper sequencing of the mechanism is produced by a sequencing timer and by limit switches placed in operable position on the machine to cooperate with the timer in a coordinated total function of the device. Therefore, it is not believed necessary to unduly burden this already extended description with a detailed analysis of one form of sequencing mechanism that could be utilized in moving the machine through the progressive steps described in the method description immediately foregoing.

EXTENDED SCOPE OF INVENTION

It is believed, however, pertinent to point out at this moment that, while electrically actuated equipment, such as the drive motor 378, electrically controlled air motor 192, and solenoid cam locking device 222, have been shown, these are not limiting. The control system might also well be in the form of a fluid loop device such as all air-controlled and actuated mechanism, or an all-hydraulic system. As will be evident, however, the control and driving system is very much less complex when electrically programmed and controlled than would otherwise be the case with the leakages inherent to fluid system. The reason why an air motor 192 has been employed to drive the speed reducer 60 is because of its extremely low inertia. It comes to a dead stop extremely rapidly or substantially instantaneously because of the low mass of the rotor. This is distinguished from an electrical motor which, because if it is able to develop an appreciable amount of power, must have an armature of appreciable mass that resists instantaneous stopping. Further, in a small electric motor, clutch and brake arrangements become so small in physical size as to be undependable for extended operation.

Although the present invention is designed for the purpose of decorating fully vitrified china ware, it is also applicable to the decoration of earthenware that is full porcelain.

Within the extended scope of invention, it is believed that the principles involved can be applied to the decoration of ware by spraying. To so operate, a mask would be substituted for the silk screen and a spray gun for the squeegee.

The machine described above is a two-station printing machine and thus is capable of applying two colors. However, if fast-dry colors be used, a third printing station can be used at station 3, leaving station 4 for loading and unloading.

In the extended scope of invention, the machine may have larger numbers of printing stations with drying stations between by making the turntable larger and adding more chucks and printing stations in the pattern indicated for the four-chuck machine of FIG. 2.

INKS OR COLOR MEDIA

A hot melt ink can be applied at, for example, 160° F. for fluidity. This hardens instantly when it hits the cold ware. Thus, the next color can be applied immediately. For this type of application, resistance heated wire cloth screens can be used.

By operating in this manner, the color application stations can be adjacent one another, without intervening dwell stations for drying, as shown in FIG. 2. Thus, on a four-chuck machine there can be three color stations 22 and the fourth station can be used for the load and unload station.

Cold colors are the primary design medium of the present invention. When using these systems, infrared dryers are used at station 3. This is indicated by the reference numeral 472, FIG. 2.

Solvent systems also can be used in the present four-station machine. By so operating, a removal hood will be placed over station 3 with heating means, such as the infrared dryer 472, to evaporate the solvent.

Organic inks also can be used with ultra high frequency (UHF) dryers to cook and set the organic vehicle. These dryers would be substituted for the element 472 at station 3.

I claim:

1. In apparatus for decorating ware having a decorating surface:
   a frame;
   decoration-applying means carried by said frame and having a path of operation and an axis of movement to and from said path of operation;
   a turntable carried by said frame with the periphery movable in operable alignment relative to said decoration-applying means;
   chuck means carried by said turntable to hold a piece of ware so that said decorating surface is positioned in decorating relationship to said decoration-applying means by movement of said turntable and said decorating surface to said path of operation;
   said decoration-applying means including a carriage mounted on said frame for movement parallel to said axis of movement;
   a silk screen mounted on said carriage for movement into printing relationship to said piece of ware when held by said chuck means with said decorating surface positioned at said path of operation;
   squeegee means supported by said carriage and movable relative to said carriage and parallel to said axis of movement;
   means for moving said squeegee means over the surface of said screen to force said screen to said path of operation and transfer color through said screen to said decorating surface of said ware; and
   means for moving said squeegee means into and out of contact with said screen while the squeegee is moving in a manner traversing the surface of said screen.

2. In a ware decoration apparatus:
   a frame;
   a carriage;
   means for mounting said carriage on said frame for movement;
   a silk screen supported by said carriage for movement therewith;
   a quill adapter mounted on said carriage;
   a quill rotatable and axially movable within said quill adapter;
   rotating means connected to said quill;
   means on said carriage for axially moving said quill;
   means operably connecting said axially moving means and said quill;
   drive means supported on said carriage and operably engaging said quill rotating means to rotate said quill; and
   means carried by said drive means engageable with said axially moving means to axially move said quill during rotation of said quill.

3. In ware decorating apparatus:
   a carriage;
   a silk screen mounted on said carriage in fixed relationship;
   a quill adapter mounted on said carriage in fixed relationship;
   a tubular quill rotatable and axially movable within said adapter;
   rotating means operably connected to said quill;
   means on said carriage and engageable with said quill for axially moving the same;
   drive means supported on said carriage operably connected to said quill rotating means;
   means actuated by said drive means to engage said quill moving means and axially move said quill during rotation thereof;
   a floating rod extending through said quill and engaging said screen to tension said screen to a printing condition; and
   means biasing said rod in a manner tensioning said screen.

4. In silk screen decorating apparatus:
   a carriage;
   a silk screen mounted on said carriage;
   a quill adapter mounted on said carriage;
   a tubular quill rotatable and axially movable within said adapter;

a squeegee carried by said quill for movement over said screen;
rotating means operably connected to said quill;
means mounted on said carriage and engageable with said quill to axially move the quill;
drive means supported on said carriage and operably engageable with said quill rotating means;
means actuated by said drive means to actuate said quill moving means and axially move said quill during rotation thereof to move said squeegee into and out of contact with said screen surface;
a rod freely movable within said quill and engaging said screen to tension the screen to printing condition;
means biasing said rod in a manner tensioning said screen; and
means on said carriage biasing said quill in a direction to carry said squeegee into engagement with said screen, and said means for axially moving said quill overriding said biasing means.

5. In silk screen decoration apparatus:
a carriage;
a silk screen mounted on said carriage;
a quill adapter mounted on said carriage;
a quill rotatable and axially movable within said adapter;
a squeegee carried by said quill for movement over said screen;
a gear connected to said quill and having a hub with a lip formed thereon;
a yoke pivotally mounted on said carriage and having means thereon movably engageable with said lip to axially move said quill;
drive means supported on said carriage and having a gear operably engageable with said quill gear;
a cam block on said drive gear engageable with said yoke to axially move said quill and thereby move said squeegee into and out of contact with said screen surface while said squeegee is moving; and
means on said carriage biasing said gear in a manner to carry said squeegee into engagement with said screen, said cam block-yoke mechanism for moving said quill overriding said biasing means.